United States Patent
Tomihara et al.

(10) Patent No.: US 7,226,693 B2
(45) Date of Patent: Jun. 5, 2007

(54) CADMIUM NEGATIVE ELECTRODE FOR ALKALINE STORAGE BATTERY AND METHOD FOR PRODUCING THE SAME

(75) Inventors: Kei Tomihara, Sumoto (JP); Masahiro Hosoda, Mihara-gun (JP)

(73) Assignee: Sanyo Electronic Co., Ltd., Osaka (JP)

(*) Notice: Subject to any disclaimer, the term of this patent is extended or adjusted under 35 U.S.C. 154(b) by 0 days.

(21) Appl. No.: 10/022,284

(22) Filed: Dec. 20, 2001

(65) Prior Publication Data

US 2002/0122976 A1  Sep. 5, 2002

(30) Foreign Application Priority Data

Dec. 28, 2000  (JP) ............... P. 2000-401511

(51) Int. Cl.
*H01M 2/16* (2006.01)
*H01M 6/04* (2006.01)
*H01M 4/02* (2006.01)
*H01M 4/60* (2006.01)

(52) U.S. Cl. .............. 429/137; 429/206; 429/209; 429/212

(58) Field of Classification Search .......... 429/137, 429/206, 209, 212
See application file for complete search history.

(56) References Cited

U.S. PATENT DOCUMENTS 4,180,441 A * 12/1979 Stiker et al. ............... 429/222
6,514,637 B2 * 2/2003 Treger et al. ............... 429/56

FOREIGN PATENT DOCUMENTS

| JP | 56-26365 | * | 3/1981 |
| JP | 56-35368 | * | 4/1981 |
| JP | 61-158664 | | 7/1986 |
| JP | 61-158666 | | 7/1986 |
| JP | 63-160161 | * | 7/1988 |
| JP | 63-195963 | | 8/1988 |
| JP | 10-241724 | * | 9/1998 |

OTHER PUBLICATIONS

David Linden, "Handbook of Batteries," second Edition, McGraw-Hill, Inc. 1995.*

* cited by examiner

*Primary Examiner*—Dah-Wei Yuan
(74) *Attorney, Agent, or Firm*—Nixon & Vanderhye P.C.

(57) ABSTRACT

A method for producing a cadmium negative electrode for alkaline batteries according to the present invention comprises a step of obtaining a cadmium active-substance impregnated electrode plate by impregnating said electrode substrate with a cadmium active substance; and a step of adding polyethylene glycol for forming a polyethylene glycol coating on the surface of said cadmium negative electrode or on the surface of said active substance by coating or impregnating said active-substance impregnated electrode with polyethylene glycol.

6 Claims, 3 Drawing Sheets

CADMIUM NEGATIVE ELECTRODE FOR ALKALINE STORAGE BATTERY AND METHOD FOR PRODUCING THE SAME

BACKGROUND OF THE INVENTION

The present invention relates to a cadmium negative electrode for use in alkaline batteries such as a nickel-cadmium battery, and to a method for producing the same.

Cadmium negative electrodes for use in nickel-cadmium batteries known heretofore are classified into sintered negative electrodes and non-sintered negative electrodes. A sintered negative electrode is produced by filling a nickel-sintered substrate with a negative electrode active substance made of cadmium oxide or cadmium hydroxide. On the other hand, a non-sintered negative electrode is produced by first preparing a paste by kneading a negative electrode active substance comprising cadmium oxide or cadmium hydroxide with synthetic fibers, glue material, etc., and then coating the resulting paste to an electrically conductive core body (substrate) such as a punching metal and the like.

In case an alkaline storage battery using a cadmium negative electrode of the type above is charged and discharged, the product obtained at the cadmium negative electrode on charging changes into metallic cadmium, and that on discharging changes into cadmium hydroxide. In an alkali electrolyte of high concentration, which is generally used in an ordinary alkaline storage battery, the products obtained on discharging are crystal precipitates of hexagonal β-cadmium hydroxide (β-$Cd(OH)_2$) that are stable in an alkaline electrolyte of high concentration. The β-cadmium hydroxide (β-$Cd(OH)_2$) crystals possess thin platy hexagonal crystal structure, and even with a small amount, they may cause clogging at the apertures of fine pores of the cadmium negative electrode, or cover the surface of the active metallic cadmium.

If a case as such stated above occurs even in case non-discharged metallic cadmium (Cd) still remains inside the cadmium negative electrode, the non-discharged metallic cadmium finds difficulty in achieving ion conductivity with the electrolyte, and this makes discharging impossible. Furthermore, if the platy crystals of β-cadmium hydroxide (β-$Cd(OH)_2$) as above grow into coarse grains, the surface of the particles decreases as to lower the rate of charge-discharge reaction. Then, difficulties occur on charging the coarse particles in the product on discharging, i.e., β-cadmium hydroxide (β-$Cd(OH)_2$))

The coarse particles of β-cadmium hydroxide (β-$Cd(OH)_2$) remaining without being charged further grow into coarser grains during discharging, and make the discharge of metallic cadmium (Cd) remaining inside the cadmium negative electrode still more difficult by clogging the numerous pores in the cadmium negative electrode or by covering the surface of the active metallic cadmium (Cd). In this manner, metallic cadmium (Cd) remaining non-discharged or cadmium hydroxide ($Cd(OH)_2$) remaining non-charged tended to increase in amount with progressive charge-discharge reaction, and this gradually lowered the usability factor of the active substance to result in a problematic decrease in discharge capacity.

In the light of the aforementioned circumstances, there has been proposed, in JP-A-Sho61-158664 (the term "JP-A" as referred herein signifies "an unexamined published Japanese patent application") or in JP-A-Sho61-158666, to form a coating of poly(vinyl alcohol) (PVA) or methyl cellulose (MC), which prevents the diffusion of hydroxide ions, on the surface of the cadmium negative electrode or on the surface of the negative electrode active substance. In the cadmium negative electrode proposed in the published patent applications above, a coating of poly(vinyl alcohol) (PVA) or methyl cellulose (MC) formed on the surface of the cadmium negative electrode or on the negative electrode active substance functions as to hinder the diffusion of the hydroxide ions.

Since the concentration of the hydroxide ions decreases in the vicinity of the active substance during discharging, there grows γ-cadmium hydroxide (γ-$Cd(OH)_2$), which is stable in an aqueous alkaline solution of high concentration. Since γ-cadmium hydroxide (γ-$Cd(OH)_2$) generates in the form of monoclinic acicular single crystals, the surface of the metallic cadmium (Cd) is less covered by γ-cadmium hydroxide (γ-$Cd(OH)_2$). Accordingly, not only the drop in usability factor of the active substance, but also the decrease in discharge capacity can be prevented from occurring as to suppress the degradation in charge-discharge cycle characteristics.

However, since poly(vinyl alcohol) (PVA) is sparingly soluble in water at room temperature, it must be dissolved in hot water in case of forming the coating on the surface of the cadmium negative electrode, and the resulting solution of poly(vinyl alcohol) (PVA) must then be applied or impregnated to the surface of the cadmium negative electrode. This caused a problem of making the production of cadmium negative electrode complicated. Furthermore, there was found another problem that a coating of poly(vinyl alcohol) (PVA) cannot sufficiently suppress the degradation of charge-discharge characteristics.

Further, in JP-A-Sho63-195963 is proposed a method of adding a polysaccharide, such as methyl cellulose (MC), or a derivative thereof into the cadmium negative electrode, and, although a polysaccharide such as methylcellulose (MC) certainly dissolves into an alkaline solution, it was unable to sufficiently exhibit the effect of suppressing the degradation. Hence, there occurred a problem that it insufficiently suppress the degradation of the charge-discharge characteristics. There was also proposed a method of adding poly(vinyl pyrrolidone) (PVP), which easily dissolves into water at room temperature, into the cadmium negative electrode. However, since poly(vinyl pyrrolidone) (PVP) swells in an alkaline solution, it could not sufficiently exhibit the effect of suppressing the degradation, and this also led to a problem of exhibiting insufficient effect on suppressing the degradation of the charge-discharge characteristics.

SUMMARY OF THE INVENTION

In the light of the aforementioned circumstances, the present invention has been made to overcome the problems above, and an object of the present invention is to provide a cadmium negative electrode having superior charge-discharge characteristics by forming a coating having excellent effect on suppressing the degradation on the surface of the cadmium negative electrode or the surface of the negative electrode active substance.

In order to achieve the object above, the cadmium negative electrode for alkaline batteries according to the present invention comprises an electrode substrate that is filled with an active substance, wherein the surface of said cadmium negative electrode or the surface of said active substance is covered with a coating of polyethylene glycol (PEG).

In case a coating of polyethylene glycol (PEG) is formed on the surface of a cadmium negative electrode or on the surface of a cadmium active substance, β-cadmium hydroxide (β-Cd (OH) 2) generates as the cadmium hydroxide, i.e., the product on discharging; however, since platy crystals of β-cadmium hydroxide (β-Cd(OH)$_2$) do not grow considerably, the surface of an active metallic cadmium is less effectively covered with a small amount thereof, or the aperture of the fine pores in the cadmium negative electrode becomes less clogged. Hence, the decrease in the usability factor of the active substance can be suppressed as to prevent the drop in the discharge capacity, and the degradation in charge-discharge characteristics can be thereby suppressed.

In addition to the effect of decreasing the induction of covering the surface of metallic cadmium or clogging the aperture of the fine pores in the cadmium negative electrode with the platy β-cadmium hydroxide (β-Cd(OH)$_2$), which is the product on discharging, the use of fine particles of metallic cadmium (Cd) as the product on charging prevents their surface from being covered with β-cadmium hydroxide.

If a coating is formed with polyethylene glycol (PEG) having low molecular weight, β-cadmium hydroxide (β-Cd (OH)$_2$) that has grown into platy crystals are obtained as the cadmium hydroxide, i.e., the product on discharging, and these cause clogging of the apertures of the fine pores, or cover the surface of the active metallic cadmium. Accordingly, the discharge capacity decreases as a result of the lowering in the usability factor of the active substance, thereby leading to the degradation in the charge-discharge characteristics.

On the other hand, since polyethylene glycol (PEG) having too large a molecular weight yields too high a viscosity, the viscosity of the aqueous solution that is applied to the negative electrode results too high as to make uniform coating difficult. Accordingly, it is preferred to form a coating with polyethylene glycol (PEG) having a molecular weight of 600 or higher but not higher than 20000.

In order to achieve the objects above, a method for producing a cadmium negative electrode for alkaline batteries according to the present invention comprises a step of obtaining a cadmium active-substance impregnated electrode plate by impregnating said electrode substrate with a cadmium active substance; and a step of adding polyethylene glycol for forming a polyethylene glycol coating on the surface of said cadmium negative electrode or on the surface of said active substance by coating or impregnating said active-substance impregnated electrode with polyethylene glycol.

As described above, a coating of polyethylene glycol can be easily formed on the surface of the cadmium negative electrode or on the surface of the cadmium active substance by coating or impregnating an active-substance impregnated electrode plate with polyethylene glycol.

In this case, since polyethylene glycol can be easily dissolved in water at room temperature, a solution obtained by dissolving polyethylene glycol having a mean molecular weight of 600 or higher but not higher than 20000 in a solvent can be simply applied to the surface of the active-substance impregnated electrode plate or impregnated therein. Hence, the step of coating or impregnating the active-substance impregnated electrode plate with polyethylene glycol can be simplified. After coating or impregnating the active-substance impregnated electrode plate with polyethylene glycol, it is preferred that the method comprises a drying step for drying the electrode plate.

DETAILED DESCRIPTION OF THE EMBODIMENTS

Figure 1:
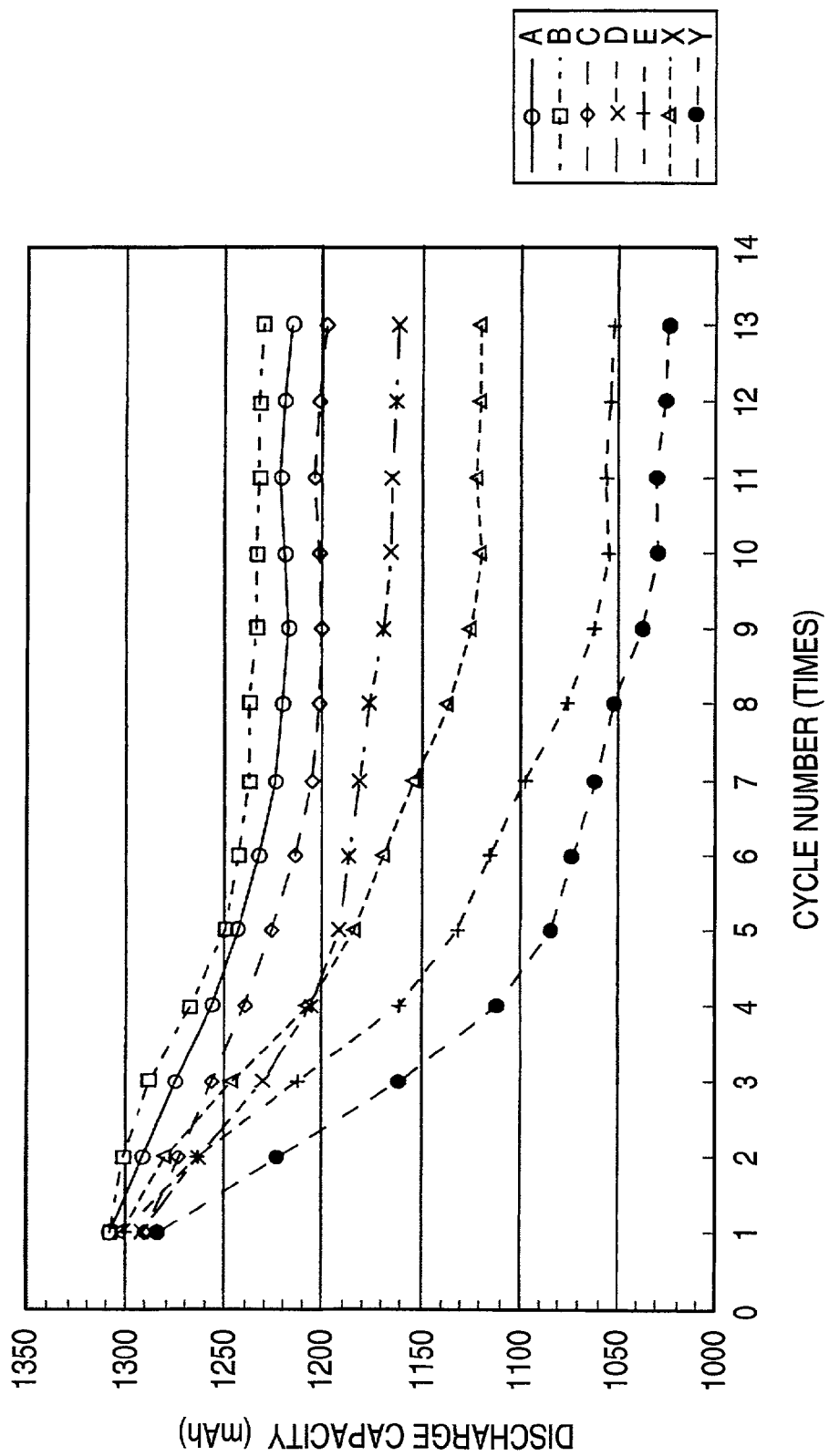
FIG. 1 is a diagram showing the relation between the charge-discharge cycle and discharge capacity.

An embodiment of the cadmium negative electrode for alkaline batteries according to the present invention is described below based on its production steps.

1. Active-Substance Filling Step

The surface of an electrically conductive core body made from a punching metal was coated and fixed with a slurry obtained by kneading nickel cellulose and methyl cellulose in water, and after drying, the resulting product was sintered to obtain a nickel sintered substrate having a porosity of 80%. Then, the nickel sintered substrate was immersed in an impregnating solution containing cadmium nitrate as the principal component thereof, and, after drying, it was subjected to alkali treatment comprising immersing it into aqueous sodium hydroxide solution as to obtain cadmium hydroxide as an active substance from cadmium nitrate (this method is denoted as chemical impregnation method). In this manner, the pores of the nickel-sintered substrate were filled with cadmium hydroxide. The process of chemical impregnation method was repeated for predetermined times (e.g., 5 times) as to fill the pores of the nickel sintered substrate with a predetermined amount of cadmium active substance (a negative electrode active substance based on cadmium hydroxide) to obtain an active-substance filled electrode plate.

2. Chemical Conversion and Pre-Charging Step

Then, the active-substance filled electrode plate thus obtained was subjected to a chemical conversion treatment comprising repeating charging and discharging in an aqueous alkaline solution (for instance, those of sodium hydroxide, potassium hydroxide, etc.), and was partially charged to obtain a predetermined pre-charge (reserved discharge). The resulting product was rinsed and dried to obtain an electrode plate (cadmium negative electrode y) subjected to chemical conversion and pre-charging. The pre-charging is performed by limiting the capacity of the cathode active substance smaller than that of the negative electrode active substance, such that the alkali battery may be maintained at cathode limit.

3. Polymer Coating Treatment Step (1) EXAMPLE 1

Subsequently, the electrode plate thus obtained in the chemical conversion and pre-charging step was immersed in water, and after pulling up the electrode plate from water and wiping off excessive water therefrom, it was immersed in an aqueous solution containing 5% by mass of polyethylene glycol (PEG: having a mean molecular weight of 600) for 1 minute. Thus, the chemically converted and pre-charged electrode plate was coated with polyethylene glycol having a mean molecular weight of 600 by pulling up the electrode plate from the aqueous polyethylene glycol solution, removing off excessive solution, and drying at 80° C. for 20 minutes. In this manner, a coating of polyethylene glycol having a mean molecular weight of 600 was formed on the surface of the cadmium negative electrode or on the surface of the cadmium active substance. Thus was obtained an electrode plate of Example 1 to provide a cadmium negative electrode a.

(2) EXAMPLE 2

Similarly, the electrode plate thus obtained in the chemical conversion and pre-charging step was immersed in water, and after pulling up the electrode plate from water and wiping off excessive water therefrom, it was immersed in an aqueous solution containing 5% by mass of polyethylene glycol (PEG: having a mean molecular weight of 6000) for 1 minute. Thus, the chemically converted and pre-charged electrode plate was coated with polyethylene glycol having a mean molecular weight of 6000 by pulling up the electrode plate from the aqueous polyethylene glycol solution, removing off excessive solution, and drying at 80° C. for 20 minutes. In this manner, a coating of polyethylene glycol having a mean molecular weight of 6000 was formed on the surface of the cadmium negative electrode or on the surface of the cadmium active substance. Thus was obtained an electrode plate of Example 2 to provide a cadmium negative electrode b.

(3) EXAMPLE 3

Similarly, the electrode plate thus obtained in the chemical conversion and pre-charging step was immersed in water, and after pulling up the electrode plate from water and wiping off excessive water therefrom, it was immersed in an aqueous solution containing 5% by mass of polyethylene glycol (PEG: having a mean molecular weight of 20000) for 1 minute. Thus, the chemically converted and pre-charged electrode plate was coated with polyethylene glycol having a mean molecular weight of 20000 by pulling up the electrode plate from the aqueous polyethylene glycol solution, removing off excessive solution, and drying at 80° C. for 20 minutes. In this manner, a coating of polyethylene glycol having a mean molecular weight of 20000 was formed on the surface of the cadmium negative electrode or on the surface of the cadmium active substance. Thus was obtained an electrode plate of Example 3 to provide a cadmium negative electrode c.

(4) EXAMPLE 4

Similarly, the electrode plate thus obtained in the chemical conversion and pre-charging step was immersed in water, and after pulling up the electrode plate from water and wiping off excessive water therefrom, it was immersed in an aqueous solution containing 5% by mass of polyethylene oxide (which is polyethylene glycol having a mean molecular weight of 5 million) for 1 minute. Thus, the chemically converted and pre-charged electrode plate was coated with polyethylene glycol having a mean molecular weight of 5 million by pulling up the electrode plate from the aqueous polyethylene glycol solution, removing off excessive solution, and drying at 80° C. for 20 minutes. In this manner, a coating of polyethylene glycol having a mean molecular weight of 5 million was formed on the surface of the cadmium negative electrode or on the surface of the cadmium active substance. Thus was obtained an electrode plate of Example 4 to provide a cadmium negative electrode d.

(5) EXAMPLE 5

Similarly, the electrode plate thus obtained in the chemical conversion and pre-charging step was immersed in water, and after pulling up the electrode plate from water and wiping off excessive water therefrom, it was immersed in an aqueous solution containing 5% by mass of polyethylene glycol (PEG: having a mean molecular weight of 200) for 1 minute. Thus, the chemically converted and pre-charged electrode plate was coated with polyethylene glycol having a mean molecular weight of 200 by pulling up the electrode plate from the aqueous polyethylene glycol solution, removing off excessive solution, and drying at 80° C. for 20 minutes. In this manner, a coating of polyethylene glycol having a mean molecular weight of 200 was formed on the surface of the cadmium negative electrode or on the surface of the cadmium active substance. Thus was obtained an electrode plate of Example 5 to provide a cadmium negative electrode e.

(6) COMPARATIVE EXAMPLE 1

Similarly, the electrode plate thus obtained in the chemical conversion and pre-charging step was immersed in water, and after pulling up the electrode plate from water and wiping off excessive water therefrom, it was immersed in an aqueous solution containing 5% by mass of polyvinyl alcohol (PVA: having a mean molecular weight of 30000) for 1 minute. Thus, the chemically converted and pre-charged electrode plate was coated with polyvinyl alcohol having a mean molecular weight of 30000 by pulling up the electrode plate from the aqueous polyvinyl alcohol solution, removing off excessive solution, and drying at 80° C. for 20 minutes. In this manner, a coating of polyvinyl alcohol having a mean molecular weight of 30000 was formed on the surface of the cadmium negative electrode or on the surface of the cadmium active substance. Thus was obtained an electrode plate of Comparative Example 1 to provide a cadmium negative electrode x.

(7) COMPARATIVE EXAMPLE 2

Furthermore, an electrode plate as obtained in the chemical conversion and pre-charging was used as it is without subjecting it to the polymer coating treatment. Thus was obtained an electrode plate of Comparative Example 2 to provide a cadmium negative electrode y.

4. Production of a Sealed Type Nickel-Cadmium Battery

Each of the cadmium negative electrodes a, b, c, d, e, x, and y thus obtained was cut into a predetermined size, and a known sintered nickel cathode plate was wound around and disposed faced to the negative electrode with a nylon non-woven separator incorporated between them to obtain each of the electrode bodies. After inserting each of the electrode bodies in the cans, 25 mass of an aqueous solution of potassium hydroxide (KOH) was injected into the cans and sealed to obtain each of the nickel-cadmium batteries (having a nominal capacity of 1300 mAh) A, B, C, D, E, X, and Y.

Thus, the nickel-cadmium battery A was obtained by using the cadmium negative electrode a, the nickel-cadmium battery B was obtained by using the cadmium negative electrode b, the nickel-cadmium battery C was obtained by using the cadmium negative electrode c, the nickel-cadmium battery D was obtained by using the cadmium negative electrode d, the nickel-cadmium battery E was obtained by using the cadmium negative electrode e, the nickel-cadmium battery X was obtained by using the cadmium negative electrode x, and the nickel-cadmium battery Y was obtained by using the cadmium negative electrode y.

5. Measurement of Charge-Discharge Cycle Characteristics

Then, by using the nickel-cadmium batteries A, B, C, D, E, X, and Y thus obtained, each of the batteries A, B, C, D, E, X, and Y was charged at room temperature (about 25° C.) at a charge current of 130 mA (0.1 It) for 16hours, and after stopping charging for 1 hour, the batteries were each allowed to discharge at a discharge current of 6500 mA (5 It) until the battery voltage reached 0.6 V, and discharging was stopped for 1 hour. This charge-discharge cycle test was repeated 13 cycles, and the discharge capacity (mAh) was measured for each cycle to obtain results as shown in FIG. 1.

The results shown in FIG. 1 clearly reads that in the battery A using the cadmium negative electrode a provided thereon a coating of a PEG having a mass molecular weight of 600, the battery B using the cadmium negative electrode b provided thereon a coating of a PEG having a mass molecular weight of 6000, the battery C using the cadmium negative electrode c provided thereon a coating of a PEG having a mass molecular weight of 20000, the battery D using the cadmium negative electrode d provided thereon a coating of a PEG having a mass molecular weight of 5 million, the battery E using the cadmium negative electrode e provided thereon a coating of a PEG having a mass molecular weight of 200, and the battery X using the cadmium negative electrode x provided thereon a coating of a PVA having a mass molecular weight of 30000, the deterioration in capacity is suppressed as compared with the case of the battery y using the cadmium negative electrode y having no polymer coating provided thereon.

The result above can be explained by the fact that the deterioration in capacity with repeated charge-discharge cycle occurs due to the accumulation of metallic cadmium (Cd) unable of causing discharge. Thus, in the cadmium negative electrode y having no polymer coating formed on the surface of the negative electrode or on the surface of the active substance, there generates the product formed on discharging, i.e., β-cadmium hydroxide (β-$Cd(OH)_2$) grown into platy crystals, which presumably, even with a small amount, effectively covers the surface of metallic cadmium (Cd) or prevents hydroxide ions in the electrolyte from reaching metallic cadmium (Cd).

Furthermore, it can be understood that the battery A using the cadmium negative electrode a provided thereon a coating of a PEG having a mass molecular weight of 600, the battery B using the cadmium negative electrode b provided thereon a coating of a PEG having a mass molecular weight of 6000, and the battery C using the cadmium negative electrode c provided thereon a coating of a PEG having a mass molecular weight of 20000 are superior to the battery X using the cadmium negative electrode x provided thereon a coating of a PVA having a mass molecular weight of 30000 concerning the effect of suppressing the degradation in cycle characteristics.

On measuring the specific surface area of the cadmium negative electrode a in the charged state and that of the cadmium negative electrode x in the charged state, as shown in Table 1 below, the specific surface area of the metallic cadmium obtained as the product of charging at the cadmium negative electrode a was found to be as large as 0.88 $m^2/g$ (i.e., the particle size of metallic cadmium is small), while that of the metallic cadmium obtained as the product of charging at the cadmium negative electrode x was found to be as small as 0.62 $m^2/g$ (i.e., the particle size of metallic cadmium is large).

TABLE 1

| Type of negative electrode | Type of polymer coating | Mean molecular weight | Specific surface area (m2/g) |
|---|---|---|---|
| a | PEG | 600 | 0.88 |
| x | PVA | 30000 | 0.62 |

As shown in Table 1, the reason why the particle diameter of the metallic cadmium obtained as the product of charging at the cadmium negative electrode a becomes smaller is presumably as follows. That is, on charging, cadmium hydroxide ($Cd(OH)_2$) once dissolves to generate an intermediate product, i.e., cadmium complex ion ($[Cd(OH)_3]^-$ or $[Cd(OH)_4]^{2-}$), and this undergoes reduction to generate metallic cadmium (Cd) as precipitates. The reason why the particle diameter of metallic cadmium produced on the cadmium negative electrode a by charging becomes small is, presumably, that the ether oxygen atoms form chelate coordination to hinder the diffusion of cadmium complex ions.

The result above is similar to known facts that, during charging at higher temperatures, crystals of metallic cadmium tend to grow easily due to the rapid diffusion of cadmium complex ion which enables immediate supply of cadmium complex ions even though there might be few crystal nuclei of metallic cadmium, while, at charging at lower temperatures, metallic cadmium precipitates without considerably moving from the site at which cadmium hydroxide is dissolved, and this results in metallic cadmium particles small in diameter. This shows that polyethylene glycol, with its trapping force for complex cadmium ions and with its viscosity, provides an environment for retarding the diffusion of complex cadmium ions in the vicinity of the cadmium negative electrode similar to the case of charging at lower temperatures.

Furthermore, it can be understood that the battery D using the cadmium negative electrode d having formed thereon a coating of polyethylene oxide (i.e., polyethylene glycol) with a mean molecular weight of 5 million, as obtained in Example 4, has an effect of suppressing the deterioration. In this case again, similar to the case above, cadmium hydroxide once dissolves on charging to form an intermediate product, i.e., cadmium complex ion, and that the ether oxygen atoms of polyethylene oxide form chelate coordination with the complex cadmium ion to hinder the diffusion of cadmium complex ions. However, the effect of suppressing the degradation is smaller in this case as compared with the case using polyethylene glycol having a mean molecular weight of 600 or higher but not higher than 20000.

On the other hand, the battery E using the cadmium negative electrode e having formed thereon a coating of polyethylene glycol with a mean molecular weight of 200, as obtained in Example 5, and the battery Y using the cadmium negative electrode y having no polymer coating provided thereon exhibit large degradation. The reason why polyethylene glycol having a mean molecular weight of 200 has small effect on suppressing the degradation is because, in case the mean molecular weight of polyethylene glycol is lowered to about 200, the viscosity of polyethylene glycol becomes too low, and hence, concerning the mechanism of producing fine particles of metallic cadmium on charging, it exerts small function of retaining complex cadmium ion in the vicinity of the cadmium negative electrode e.

Furthermore, polyethylene glycol having a mean molecular weight of 200 is liquid at an ordinary temperature (20° C.), but for polyethylene glycol having a mean molecular weight of 200, the solidification point is at the ordinary temperature (20° C.) Hence, in case of coating polyethylene glycol to the cadmium negative electrode, polyethylene glycol in the form of wax-like solid or such having a viscosity similar thereto can be more easily coated. Thus, the lower limit in mean molecular weight for polyethylene glycol is preferably set at 600. On the other hand, if the mean molecular weight of polyethylene glycol becomes as high as 5 million, the viscosity of the aqueous polyethylene glycol solution yields too high a value to make its coating difficult. Thus, the upper limit for the mean molecular weight of polyethylene glycol is preferably set at 20000, so that it may still be easily dissolved in water.

After the charge-discharge cycle test, the cadmium negative electrode a and the cadmium negative electrode x were subjected to X-ray diffraction using an X-ray diffractometer provided with a Cu-Kα radiation (analysis was made by using copper (Cu) target at an applied tube voltage of 30 kV and tube current of 12.5 mA, and at a scan rate of 3 deg/min). As a result, diffractograms as shown in FIG. 2 (for cadmium negative electrode a) and in FIG. 3 (for cadmium negative electrode x) were obtained.

Figure 2:
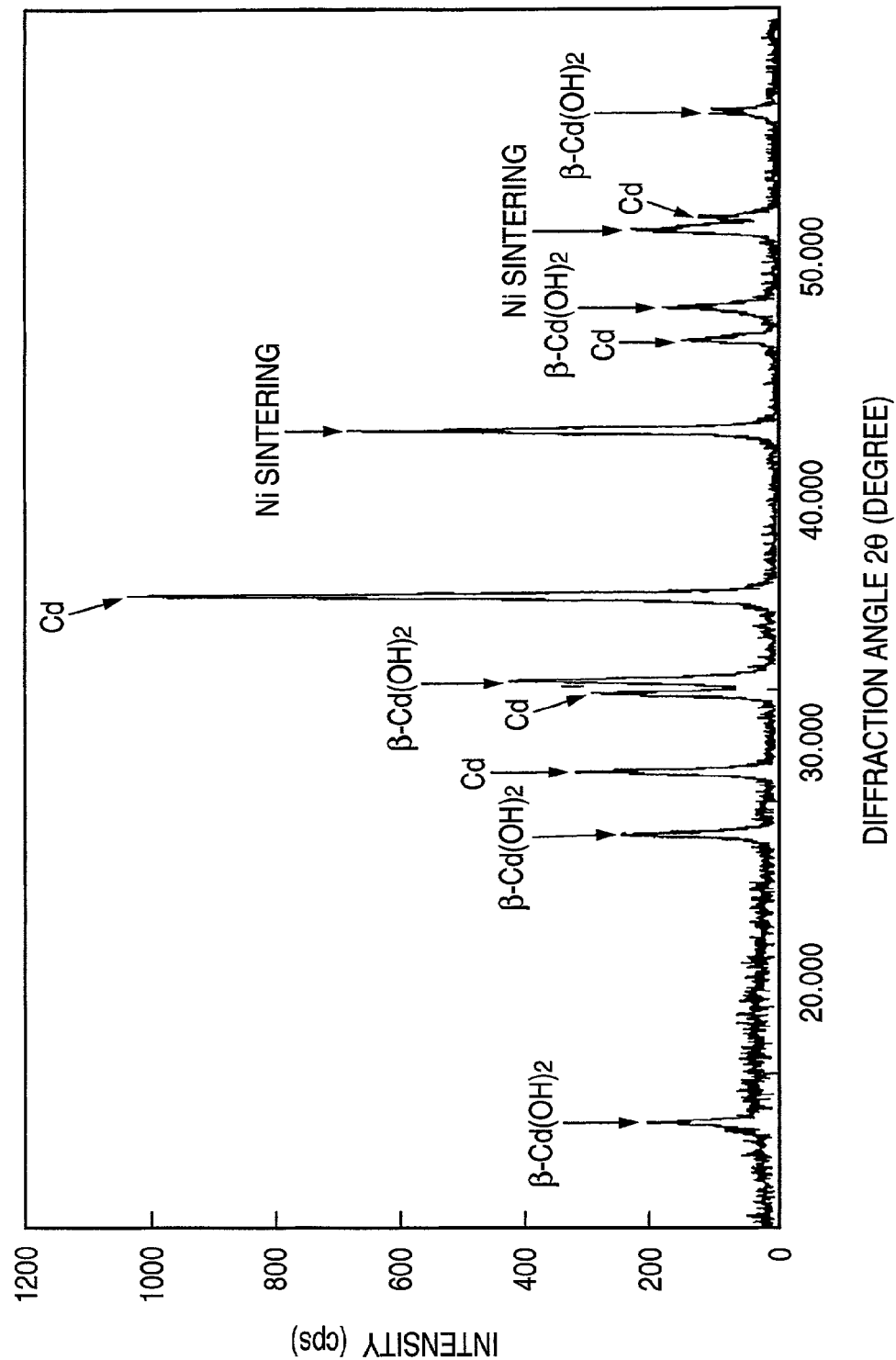
FIG. 2 is an x-ray diffractogram obtained on a cadmium negative electrode of Example 1 after discharge.
Figure 3:
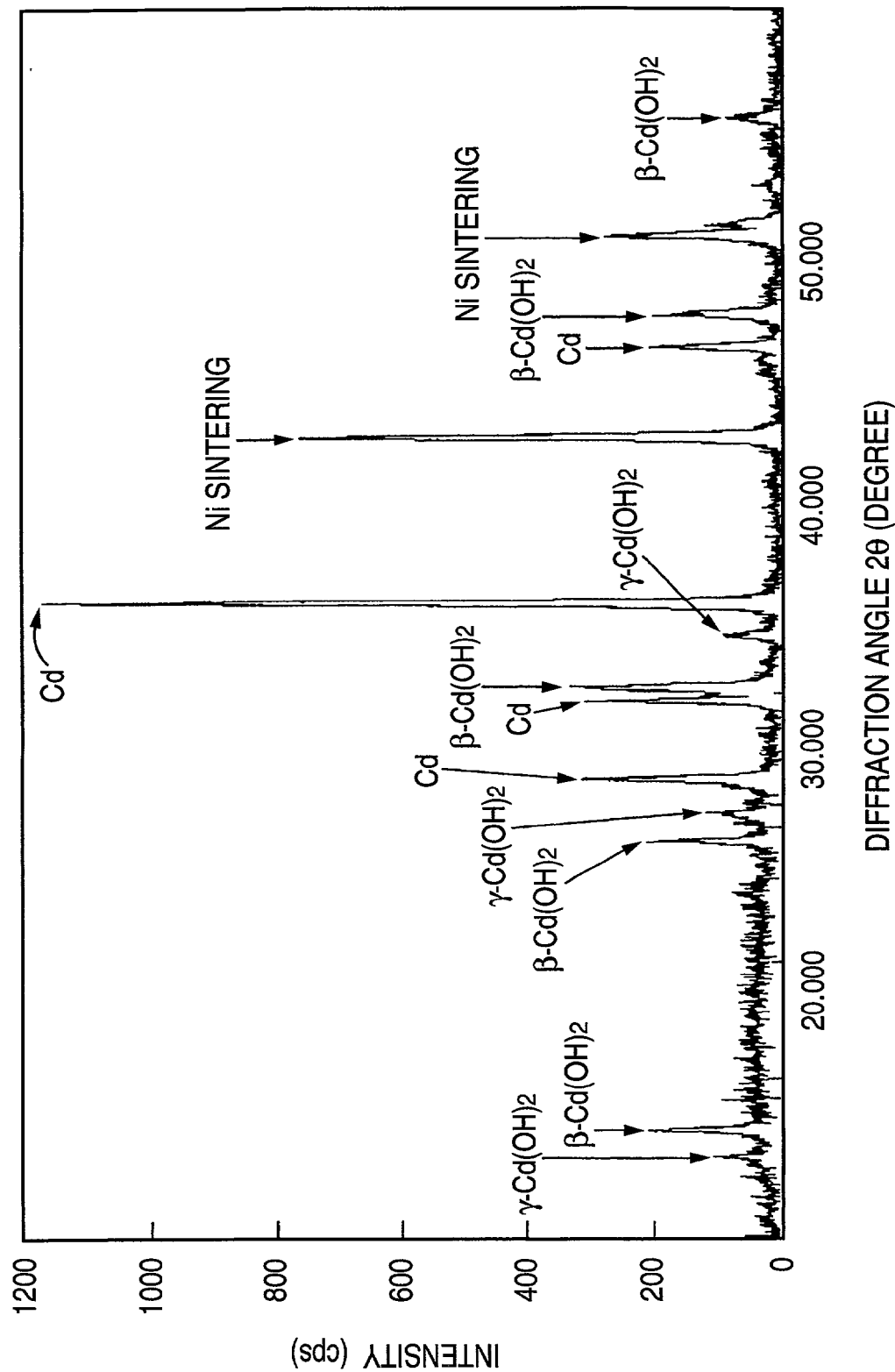
FIG. 3 is an X-ray diffractogram obtained on a cadmium negative electrode of Comparative Example 1 after discharge.

The X-ray diffractogram given in FIG. 2 clearly reads that diffraction peaks appear at diffraction angles (2θ) of 18.86°, 29.49°, 35.22°, and 48.96°. The result shows that cadmium hydroxide formed at discharge consists of β-cadmium hydroxide (β-Cd(OH)$_2$). On the other hand, FIG. 3 reads that diffraction peaks appear at diffraction angles (2θ) of 17.89°, 30.27°, and 38.17°. The result shows that γ-cadmium hydroxide (γ-Cd(OH)$_2$) had generated during discharge.

As described above, in the present invention, a coating of polyethylene glycol (PEG) is formed on the surface of a cadmium negative electrode filled with cadmium active substance or on the surface of the cadmium active substance. Thus, although the cadmium hydroxide obtained as a product on discharge is β-cadmium hydroxide (β-Cd(OH)$_2$), this β-cadmium hydroxide (β-Cd(OH)$_2$) does not grow considerably into platy crystals; accordingly, the surface of an active metallic cadmium (Cd) is less effectively covered with a small amount thereof, or the aperture of the fine pores in the cadmium negative electrode is less clogged. Hence, the decrease in the usability factor of the active substance can be prevented as to prevent a drop in the discharge capacity, and the degradation in charge-discharge characteristics can be thereby suppressed.

In the embodiments described above, explanation was made on the case of immersing a conversion treated and pre-charged electrode plate into an aqueous solution of polyethylene glycol to form a coating of polyethylene glycol on the surface of a cadmium negative electrode or on the surface of the negative electrode active substance, but the present invention is not only limited thereto, and similar effects can be obtained by applying the aqueous solution of polyethylene glycol to the surface of the cadmium negative electrode by using a brush and the like.

What is claimed is:

1. A method of producing a cadmium negative electrode for alkaline batteries, which comprises a porous, nickel-coated sintered electrode core body, the process comprising the steps of:

(a) coating a surface of a porous electrically conductive core body with nickel powder,
(b) drying and sintering the product of step (a) to form a nickel sintered electrically conductive core body,
(c) immersing the nickel sintered electrically conductive core body in an impregnating solution containing cadmium nitrate,
(d) drying,
(e) subjecting the dry nickel sintered electrically conductive core body to alkali treatment so that the pores of the nickel sintered core body are filled with cadmium hydroxide to produce a cadmium negative electrode,
(f) applying a preliminary charge to the cadmium negative electrode, and
(g) applying polyethylene glycol to a surface of said cadmium negative electrode, which exposes to a surface of the electrode, and a surface of said cadmium hydroxide containing β-Cd(OH)$_2$, which exposes to a surface of the electrode, by coating or impregnating with polyethylene glycol having a mean molecular weight of 600 or higher but not more than 20000 dissolved in a solvent.

2. The method for producing a cadmium negative electrode for an alkaline battery as claimed in claim 1, wherein, in step (f), said cadmium negative electrode is coated or impregnated with a solution of polyethylene glycol.

3. The method for producing a cadmium negative electrode for an alkaline battery as claimed in claim 1, further comprising a step of (g) drying the cadmium negative electrode after coating or impregnating said active-substance impregnated substrate with said polyethylene glycol.

4. The method for producing a cadmium negative electrode for an alkaline battery as claimed in claim 2, further comprising a step of (g) drying the cadmium negative electrode after coating or impregnating said active-substance impregnated substrate with said polyethylene glycol.

5. An alkaline storage battery comprising:
a nickel positive electrode;
a negative electrode;
a separator which separates the positive electrode from the negative electrode;
alkaline electrolyte; and
an outer can which houses the positive electrode, the negative electrode, the separator and the alkaline electrolyte therein;
wherein said negative electrode is a cadmium negative electrode as claimed in claim 1.

6. A method for producing an alkaline storage battery comprising the steps of:
producing a nickel positive electrode;
producing a negative electrode;
opposing the positive electrode and the negative electrode through a separator;
housing the positive electrode, the negative electrode, the separator in an outer can with alkaline electrolyte,
wherein said negative electrode is produced by the method for producing a cadmium negative electrode as claimed in claim 1.

* * * * *